United States Patent Office 3,223,515
Patented Dec. 14, 1965

3,223,515
METHOD FOR THE CONTROL OF PLANT GROWTH
Adolph J. Deinet, Woodcliff Lake, N.J., assignor, by mesne assignments, to Tenneco Chemicals, Inc., a corporation of Delaware
No Drawing. Filed Mar. 15, 1962, Ser. No. 180,041
2 Claims. (Cl. 71—2.3)

This invention relates to novel herbicidal compositions and to methods of inhibiting or controlling plant growth.

In accordance with this invention it has been found that certain dichloronitro compounds have unusual and valuable activity as herbicides. These compounds may be applied to soil or other medium normally supporting plant growth, or they may be applied to plants to control their growth. They can be used to control weed growth in an area containing a crop, such as corn, and they can be used to destroy all of the plants in an area.

The herbicidal compounds of the present invention are 2,6-dichloro-3-nitrobenzaldehyde and 2,6-dichloro-3-nitrobenzonitrile. These compounds may be prepared by any convenient procedure. For example, 2,6-dichlorobenzaldehyde may be nitrated with nitric acid to form 2,6-dichloro-3-nitrobenzaldehyde. The 2,6-dichloro-3-nitrobenzaldehyde may be reacted with hydroxylamine under known conditions to form 2,6-dichloro-3-nitrobenzaldoxime. Treatment of this oxime with acetic anhydride yields 2,6-dichloro-3-nitrobenzonitrile.

The dichloronitro compounds of the present invention may be applied to a wide variety of plants to control or inhibit their growth. They may be applied to an area containing a crop to inhibit the growth of weeds therein, or they may be used to destroy all of the plants in an area.

The herbicidally active compounds may be applied as such for the control of weeds and in the sterilization of soil with regard to plant growth. Ordinarily and preferably, however, these compounds are used in combination with an inert diluent or carrier to make it easier to measure accurately and to apply evenly the small amounts of the herbicides that are required to control plant growth as well as to apply them in a form that will be readily dispersed through the soil and/or absorbed by the plants. These compounds may be dispersed in water with or without the aid of a wetting agent and the resulting aqueous dispersions employed as sprays, or they may be used as the active herbicidal constituents in ketone, alcohol, ether, hydrocarbon, or chlorinated hydrocarbon solutions or in oil-in-water emulsion. Alternatively the compounds may be mixed with or deposited upon an inert finely divided solid carrier, such as a natural clay, diatomaceous earth, silica, walnut shell flour, and the like, and employed as dusts. Herbicidal granules or pellets are often used when the application is primarily to the soil. Pellets may be made by extruding moistened mixtures of the herbicide and a powdered inert carrier under high pressure through dies. Granules may be prepared by impregnating granular carriers, such as granular clays, or by granulating mixtures of the herbicides and a powdered inert carrier.

The concentration of the herbicide in the composition may vary widely and depends upon a number of factors, the most important of which are the amount of the composition to be applied per unit of area and the type or types of plants being treated. In most cases the herbicidal compositions are applied in the form of sprays, dusts, or granules that contain from about 0.1% to 80% by weight of the active component. Mixtures of the dichloronitro compounds may be present in the compositions; if desired, other herbicidal compounds may also be present.

The invention is further illustrated by the examples that follow. It is to be understood, however, that these examples are not to be construed as being limitative, but are furnished merely for the purpose of illustration.

*Example 1*

To a mixture of 375 grams of nitric acid (density 1.5) and 375 grams of 95% sulfuric acid which had been cooled to 5° C. was added 50 grams of 2,6-dichlorobenzaldehyde over a period of one hour. The reaction mixture was stirred for an additional hour at 5° C. and then poured onto 1 kilogram of crushed ice. The product was isolated by filtration, washed with water, and dried. There was obtained 57 grams of 2,6-dichloro-3-nitrobenzaldehyde, a yellow solid that melted at 66°–70° C.

*Example 2*

A mixture of 57 grams of 2,6-dichloro-3-nitrobenzaldehyde, 39.5 grams of hydroxylamine hydrochloride, 48.5 grams of potassium carbonate, 750 ml. of ethanol, and 75 ml. of water was heated at its reflux temperature for six hours. It was then acidified with 25 grams of hydrochloric acid and cooled to room temperature. After the addition of 800 grams of water, the material that had precipitated was collected, washed with water, and dried. There was obtained 33 grams of 2,6-dichloro-3-nitrobenzaldoxime.

To this oxime was added 330 grams of acetic anhydride. This mixture was heated at its reflux temperature for 30 minutes and then poured into 2 litres of water. The material that precipitated was collected, washed with water, and dried. There was obtained 26.5 grams of 2,6-dichloro-3-nitrobenzonitrile, a gray crystalline solid that melted at 101°–102° C.

*Example 3*

A series of tests was carried out in which the dichloronitro compounds whose preparation was described in Examples 1 and 2 were evaluated as herbicides. In each case the test compound was applied as a 0.3% aqueous dispersion at a rate equivalent to 10 pounds per acre.

Seeds of various plant species were planted in a medium containing equal amounts of sand and silt loam. To insure uniform growth, all of the seeds were pregerminated before planting. The herbicidal compositions were applied evenly to the surface of the soil just after planting for the pre-emergence studies. In the post-emergence tests, 8 days after planting the compositions were applied so as to wet thoroughly the foliage of the plants. The effectiveness of the dichloronitro compounds as herbicides was determined by comparison of the treated plants with untreated plants. The results of the test are given in the table that follows. In this table the numbers "0" through "10" indicate increasing order of effectiveness. Thus "0" indicates no herbicidal activity; "1" to "3," slight injury; "4" to "6," moderate injury; "7" to "9," severe injury; and "10," destruction of all plants.

HERBICIDAL ACTIVITY OF 2,6-DICHLORO-3-NITROBENZ-
ALDEHYDE AND 2,6-DICHLORO-3-NITROBENZONITRILE
AGAINST REPRESENTATIVE PLANT SPECIES

| Plant Species | 2,6-Dichloro-3-nitrobenzaldehyde | | 2,6-Dichloro-3-nitrobenzonitrile |
|---|---|---|---|
| | Pre-Emergence | Post-Emergence | Pre-Emergence |
| Corn | 0 | 2 | 0 |
| Wheat | 7 | 0 | 8 |
| Radish | 5 | 5 | 3 |
| Ryegrass | 7 | 0 | 10 |
| Mustard | 10 | 10 | 8 |
| Foxtail | 8 | 5 | 3 |

The data in the foregoing table demonstrate that 2,6-dichloro-3-nitrobenzaldehyde and 2,6-dichloro-3-nitrobenzonitrile are effective selective herbicides against a wide variety of plant species.

What is claimed is:

1. The method for the control of plant growth which comprises applying to a medium normally supporting plant growth a phytotoxic amount of 2,6-dichloro-3-nitrobenzaldehyde.

2. The method for the control of plant growth which comprises applying to the plants a phytotoxic amount of 2,6-dichloro-3-nitrobenzaldehyde.

References Cited by the Examiner

UNITED STATES PATENTS

| | | | |
|---|---|---|---|
| 2,394,916 | 2/1946 | Jones | 72—2.6 |
| 3,009,806 | 11/1961 | Weil et al. | 71—2.6 |
| 3,013,873 | 12/1961 | Hart et al. | 71—2.6 |
| 3,027,248 | 3/1962 | Koopman et al. | 71—2.3 |

OTHER REFERENCES

Jones et al., "Biochemical Journal," vol. 48, pages 422–425, 1951.

Lock, "Chemical Abstracts," vol. 29, 1935, columns 7304–7305.

Meisenheimer et al., "Chemical Abstracts," vol. 26, 1932, page 4315.

LEWIS GOTTS, *Primary Examiner.*

MAURICE A. BRINDISI, JULIAN S. LEVITT,
*Examiners.*